United States Patent
Fukata et al.

(10) Patent No.: US 7,161,733 B2
(45) Date of Patent: Jan. 9, 2007

(54) REMOTE SENSING APPARATUS AND A FREQUENCY ANALYSIS METHOD OF THE REMOTE SENSING APPARATUS

(75) Inventors: Shimpei Fukata, Kawasaki (JP); Noboru Narumi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/365,860

(22) Filed: Mar. 2, 2006

(65) Prior Publication Data

US 2006/0169932 A1    Aug. 3, 2006

Related U.S. Application Data

(63) Continuation of application No. PCT/JP05/16650, filed on Sep. 9, 2005.

(30) Foreign Application Priority Data

Sep. 9, 2004    (JP) .............................. 2004-262702

(51) Int. Cl.
 G02F 2/02    (2006.01)
 G01D 5/26    (2006.01)
(52) U.S. Cl. ..................... 359/326; 250/230; 250/233
(58) Field of Classification Search ........ 250/230–233, 250/236, 227.18, 227.23; 359/326–332
See application file for complete search history.

(56) References Cited

U.S. PATENT DOCUMENTS 5,422,477 A * 6/1995 de La Chapelle et al. ..................... 250/227.12

FOREIGN PATENT DOCUMENTS

JP    2005-37206    2/2005

* cited by examiner

*Primary Examiner*—John D. Lee
(74) *Attorney, Agent, or Firm*—Oblon, Spivak, McClelland, Maier & Neustadt, P.C.

(57) ABSTRACT

A remote sensing apparatus includes an optical system device, a frequency converter, and a frequency analyzer. The device transmits laser light generated from a laser light source toward an optical pattern rotary plate to receive its reflection light by an optical receiver. The plate is a measurement object. The converter converts a reception signal obtained by the receiver into a signal in a frequency domain. The analyzer analyzes a frequency component of the signal obtained by the converter, selects candidate values of sideband wave frequencies from the signal in the frequency region, obtains an approximate value of a rotational frequency by decision of a majority of intervals of the sideband wave frequencies, obtains candidate values of the carrier frequency from the approximate value, and selects the rotational frequency on the basis of the candidate values of the rotational frequency from among the candidate values of the carrier frequency.

2 Claims, 3 Drawing Sheets

REMOTE SENSING APPARATUS AND A FREQUENCY ANALYSIS METHOD OF THE REMOTE SENSING APPARATUS

CROSS REFERENCE TO RELATED APPLICATIONS

This is a Continuation Application of PCT Application No. PCT/JP2005/016650, filed Sep. 9, 2005, which was published under PCT Article 21(2) in Japanese.

This application is based upon and claims the benefit of priority from prior Japanese Patent Application No. 2004-262702, filed Sep. 9, 2004, the entire contents of which are incorporated herein by reference.

BACKGROUND OF THE INVENTION

1. Field of the Invention

The present invention relates to a remote sensing apparatus for transmitting laser light toward a rotary plate with an optical pattern formed thereon (hereinafter, referred to as optical pattern rotary plate) and convert a signal which is reflection light of the laser light and received by an optical receiver into a frequency domain to perform frequency analysis of the signal.

2. Description of the Related Art

A remote sensing apparatus represented by a conventional laser radar irradiates laser light toward an optical pattern rotary plate being a measurement object to receive reflection light from the object, converts the reception signal into a signal in a frequency domain to perform frequency analysis, then extracts characteristic information of the object (for example, refer to Japan Patent Application Publication [KOKAI] No. 2005-037206). As for its frequency analytical method, a frequency having maximum vibration amplitude in a carrier frequency domain is determined as a carrier frequency candidate value if the reflection light is frequency modulated (FM) by an optical pattern of the object. The carrier frequency candidate value is obtained through the use of a fact that a difference between a carrier frequency and a sideband wave frequency is equal to a rotational frequency. However, this analysis method sometimes cannot correctly select the carrier frequency candidate value when the carrier frequency does not become a maximum value.

BRIEF SUMMARY OF THE INVENTION

According to a first aspect of the present invention, there is provided a remote sensing apparatus, comprising: an optical system device which transmits laser light generated from a laser light source toward an optical pattern rotary plate being a measurement object to receive its reflection light by an optical receiver; a frequency converter which converts a reception signal obtained by the optical receiver into a signal in a frequency domain; and a frequency analyzer which analyzes a frequency component of the signal in the frequency domain obtained by the frequency converter, wherein the frequency analyzer selects candidate values of sideband wave frequencies from the signal in the frequency domain, obtains an approximate value of a rotational frequency by decision of a majority of intervals of the sideband wave frequencies, obtains candidate values of a carrier frequency from the approximate value and selects the rotational frequency on the basis of the candidate values of the rotational frequency from among the candidate values of the carrier frequency.

According to a second aspect of the present invention, there is provided a frequency analysis method of a remote sensing apparatus which transmits laser light toward an optical pattern rotary plate being a measurement object, receives its reflection light from an optical receiver and converts its reception signal obtained by the optical receiver into a signal in the frequency domain to perform a frequency analysis, the method comprising: a first step of selecting candidate values of sideband wave frequencies from the signal converted into one in the frequency domain to obtain an approximate value of a rotational frequency by decision of a majority of intervals of the sideband wave frequencies; a second step of obtaining candidate values of a carrier frequency from selection results of the candidate values of the sideband wave frequencies; and a third step of selecting the rotational frequency on the basis of candidate values of the rotational frequency from among the candidate values of the carrier frequency.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
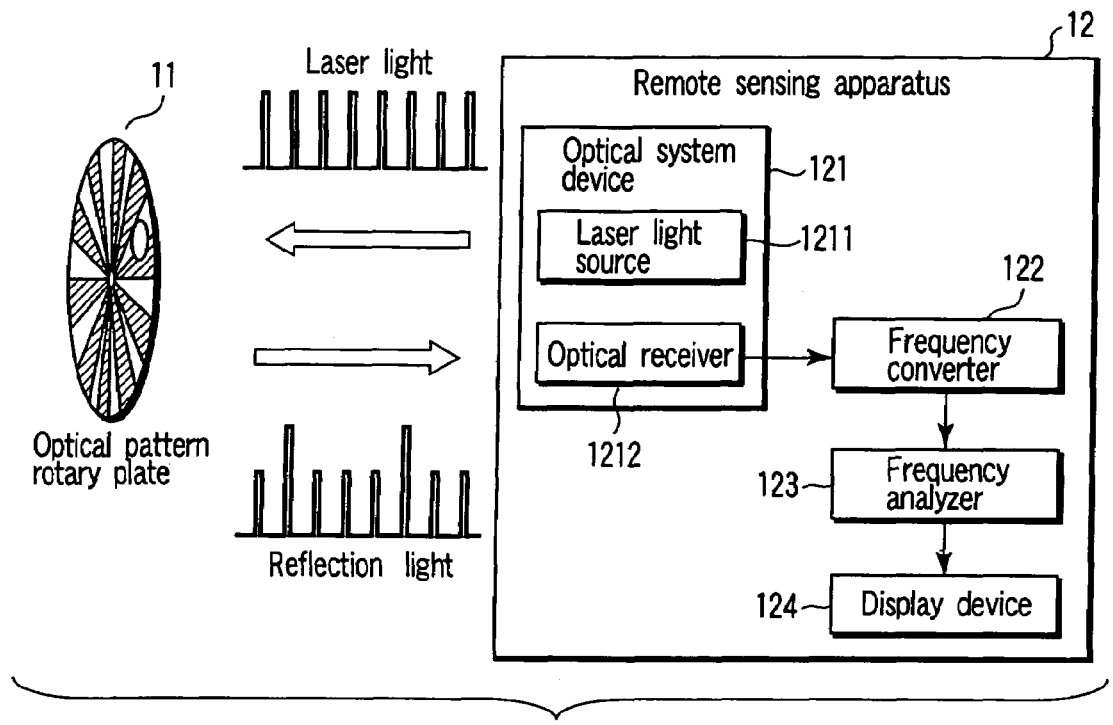
FIG. 1 is an exemplary block diagram showing a configuration of an embodiment of a remote sensing apparatus.

Hereinafter, embodiments of the present invention will be described in detail by referring to the drawings.

FIG. 1 is an exemplary view showing a schematic configuration of an embodiment of a remote sensing apparatus. In FIG. 1, an optical pattern rotary plate 11 is a measurement object to form a transmission/non-transmission pattern in a radial pattern and rotates at a specified speed. In contrast, an optical system device 121 in a remote sensing apparatus 12 includes a laser light source 1211 for radiating laser light and an optical receiver 1212 for receiving reflection light of the radiated laser light and converts it into an electric signal to output it. The laser light radiated from the laser light source 1211 is irradiated toward the rotary plate 11 being the measurement object to be reflected by the rotary plate 11 while being chopped by the rotation of an optical pattern. The reflection light becomes a pulse string to be received by the optical receiver 1212. The reception signal received here is input to a frequency converter 122 to be converted from a signal in a time region into a signal in a frequency domain through fast Fourier transform (FFT) having specified accuracy. A frequency analyzer 123 performs a frequency analysis of the signal in the frequency domain obtained as mentioned above. A display device 124 appropriately displays the analysis result.

With respect to the above-described configuration, the remote sensing apparatus 12 will be explained in detail.

The remote sensing apparatus 12 computes a carrier frequency of the rotary plate 11 to compute candidate values possible to be a rotational frequency from the carrier frequency. The sensing apparatus 12 then selects a rotational frequency on the basis of the candidate values thereof and displays result of an obtained carrier frequency and rotational frequency. Here, a rotational frequency component cannot be obtained from the carrier frequency sometimes if the reflection light is frequency modulated. In this case, the sensing apparatus 12 utilizes the fact that the difference between a sideband wave frequency and the carrier frequency becomes the rotational frequency. A maximum value of a signal in a carrier frequency domain is determined as a carrier frequency frc of the rotary plate 11.

Next, by using a relational expression of frc=frs×nd (wherein, the rotational frequency of the optical pattern plate 11 is frs; the number of divisions is nd) and the fact that a candidate value n is a finite integer value, the sensing apparatus 12 computes a candidate value frs' (n) through the use of an expression of frs' (n)=frc/n. An 'n' is selected as the number of divisions nd by which the frequency of an expression of frc'−frs' (n) becomes largest on the basis of the candidate value frs' (n). The rotational frequency frs of the rotary plate 11 can be obtained from an expression of frs=frc/nd.

Figure 2:
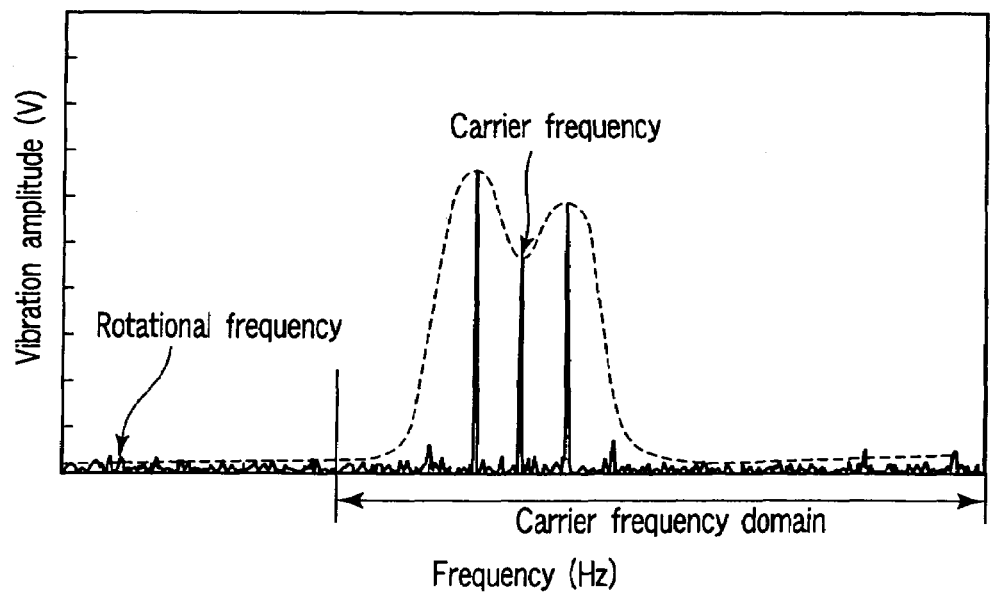
FIG. 2 is an exemplary view for explaining the fact that carrier frequency candidate values form a two-peak-like distribution when a modulation index for modulation is large in the remote sensing apparatus shown in FIG. 1.
Figure 3:
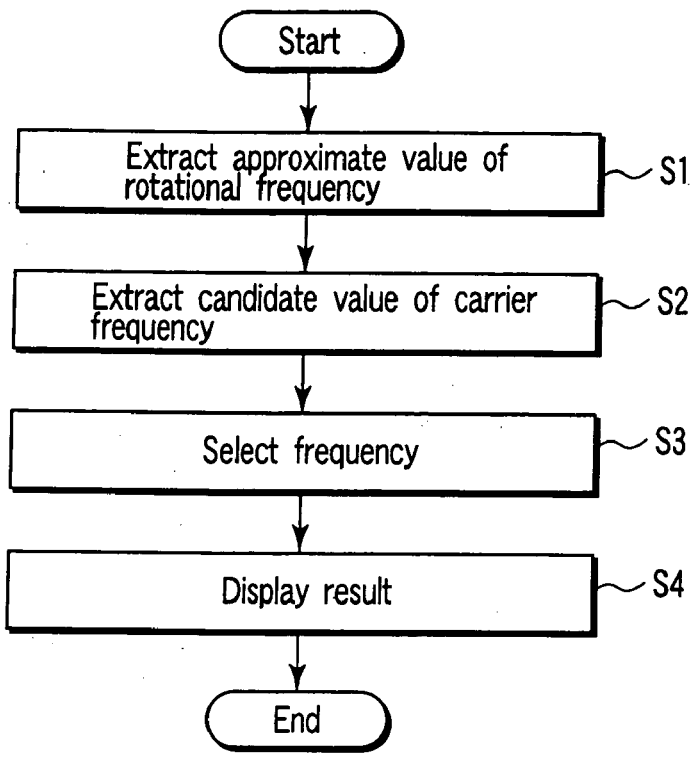
FIG. 3 is an exemplary flowchart showing the flow of processing of the remote sensing apparatus shown in FIG. 1.

However, if a modulation index of frequency modulation is larger, the candidate value of the carrier frequency forms a two-peak-like distribution as shown in FIG. 2 then the carrier frequency cannot be obtained correctly. Therefore, in this embodiment, after the carrier frequency is obtained, the sensing apparatus 12 does not obtain the rotational frequency but processes the carrier frequency in such a manner as shown in FIG. 3. This processing selects candidate values of the sideband wave frequencies to obtain an approximate value of the rotational frequency in accordance with the decision by the majority of the intervals of the sideband wave frequencies (step S1). After this, the candidate values of the carrier frequency are obtained (step S2). In further, as mentioned above, the sensing apparatus 12 selects the rotational frequency on the basis of the candidate values of the rotational frequency (step S3) and computes to display the result of the obtained carrier frequency and rotational frequency (step S4).

Hereinafter, step S1 and step S2 being distinctive parts among the foregoing steps will be described in detail.

Figure 4:
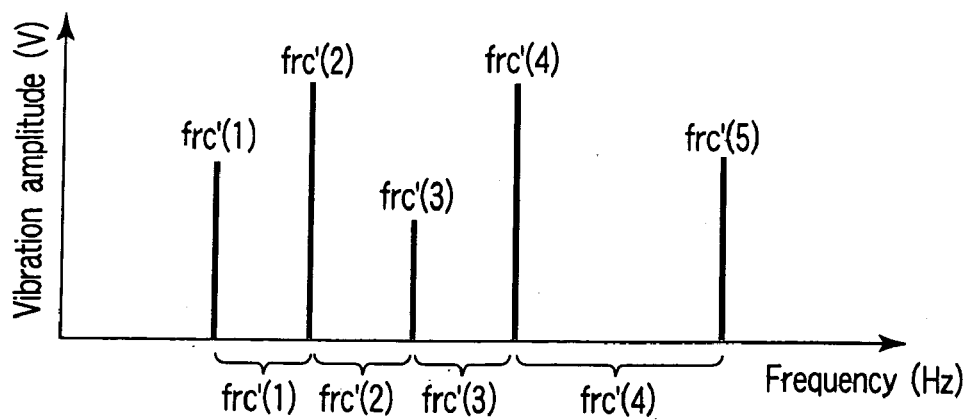
FIG. 4 is an exemplary view for explaining the processing of a step of extracting a rotational frequency approximate value shown in FIG. 3.
Figure 5:
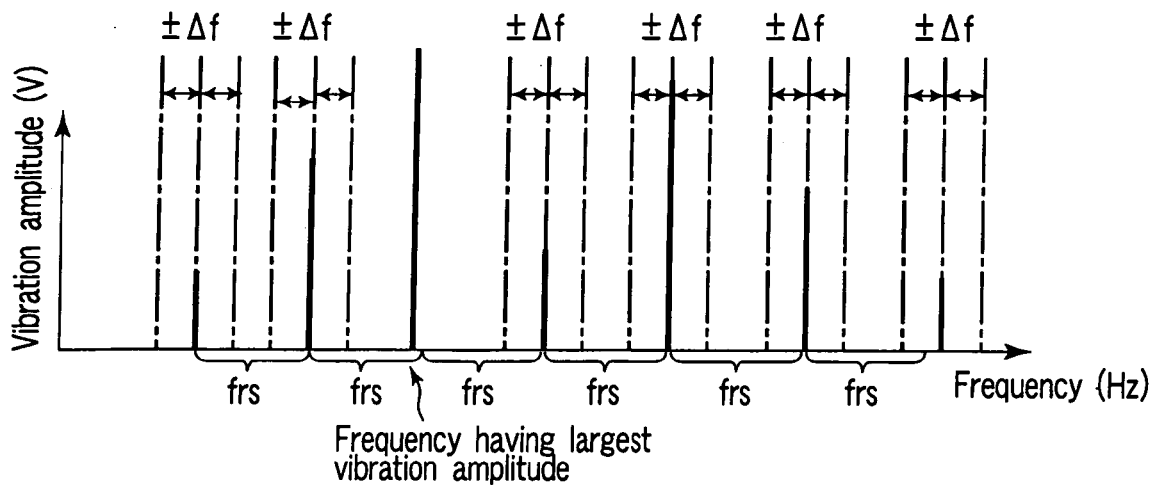
FIG. 5 is an exemplary view for explaining the processing content of a step of extracting a carrier frequency candidate value shown in FIG. 3.

In step S1, the sensing apparatus 12 extracts frequencies up to the several number (five in an example in FIG. 4) in descending order of frequencies having larger vibration amplitudes each in the carrier frequency domain as shown in FIG. 4. The sensing apparatus 12 computes the approximate rotational frequency by the decision of the majority of the intervals of the frequencies (restricted within the rotational frequency domain). In step S2, the sensing apparatus 12, as shown in FIG. 5, extracts the frequency having a maximum vibration amplitude in the vicinity of the frequencies separated by an integer multiple of the rotational frequency approximate value from the frequency having a maximum vibration amplitude in the carrier frequency domain. This processing can utilize a large possibility of a presence of the carrier frequency or the sideband wave frequencies in the vicinity of the frequency separated by the integer multiple of the approximate value of the rotational frequency from the frequency having the maximum vibration amplitude in the carrier frequency domain.

Figure 6:
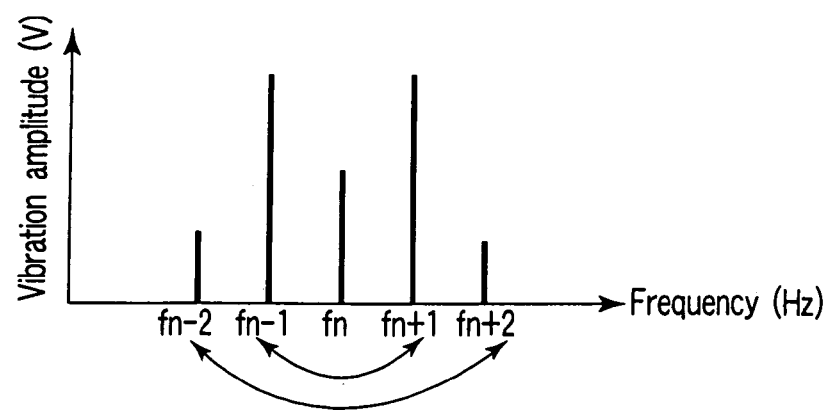
FIG. 6 is an exemplary view for explaining a carrier frequency selection method of a step of extracting the carrier frequency candidate value shown in FIG. 3.

A vibration amplitude value V in the frequency domain of the sideband wave frequency components to the carrier frequency is always formed symmetric in the right-to-left direction. By utilizing this feature, the sensing apparatus 12 selects, as shown in FIG. 6, the frequency giving a maximum degree of the symmetry in the right-to-left direction, as the carrier frequency. An evaluation function En to evaluate the degree of the symmetry in the right-to-left direction is shown as follows. However, $$\{V(fn-2) \sim V(fn+2)\} \qquad \text{(numerical expression 1)}$$

indicates an averaged value from V(fn−2) to V(fn+2).

$$En = \frac{[\{V(fn+2) - V(fn-2)\}^2 + \{V(fn+1) - V(fn-1)\}^2]}{\{V(fn-2) \sim V(fn+2)\}} \qquad \text{(numerical expression 2)}$$

When the above-mentioned evaluation function En is smaller, it is determined for the degree of the symmetry in the right-to-left direction to be high. Thereby, the 'fn', in the case of the smallest function En, is determined as the carrier frequency. The number of divisions nd can be obtained by the carrier frequency Frc and rotational frequency approximate value frs' as shown in the following expression. This situation is the same as in the conventional technique.

$$nd = frc/frs'$$

According to an above description, the rotational frequency frs can be obtained through the following expression by means of the carrier frequency frc and the number of divisions nd.

$$frs = frc/nd$$

As mentioned above, the remote sensing apparatus 12 with the foregoing configuration does not obtain the rotational frequency after obtaining the carrier frequency but conducts processing in accordance with the following procedure by taking account the fact that the candidate values of the carrier frequency form the two-peak-like distribution when the modulation index of the frequency modulation is large. In other words, the sensing apparatus 12 selects the candidate values of the sideband wave frequencies to obtain the approximate value of the rotational frequency by the decision of the majority of the intervals of the sideband wave frequencies. After this, the sensing apparatus 12 obtains the carrier frequency candidate values to select the rotational frequency on the basis of the rotational frequency candidate values and computes to display the results of the selected carrier frequency and rotational frequency. Thereby, the carrier frequency candidate values can be selected correctly even when the carrier frequency does not become the maximum value.

The invention is not limited to the specific details and representative embodiments shown and described herein, and in an implementation phase, various types of modifications may be made without departing from the spirit or scope of the general inventive concept of the invention. Various types of the invention can be formed by appropriately combining a plurality of constituent elements disclosed in the foregoing embodiments. Some of the elements, for example, may be omitted from the whole of the constituent elements shown in the embodiments mentioned above. The constituent elements over different embodiments further may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A remote sensing apparatus, comprising:
   an optical system device which transmits laser light generated from a laser light source toward an optical pattern rotary plate being a measurement object to receive its reflection light by an optical receiver;
   a frequency converter which converts a reception signal obtained by the optical receiver into a signal in a frequency domain; and
   a frequency analyzer which analyzes a frequency component of the signal in the frequency domain obtained by the frequency converter, wherein
   the frequency analyzer selects candidate values of sideband wave frequencies from the signal in the frequency domain, obtains an approximate value of a rotational frequency by decision of a majority of intervals of the sideband wave frequencies, obtains candidate values of a carrier frequency from the approximate value and selects the rotational frequency on the basis of the candidate values of the rotational frequency from among the candidate values of the carrier frequency.

2. A frequency analysis method of a remote sensing apparatus which transmits laser light toward an optical pattern rotary plate being a measurement object, receives its reflection light from an optical receiver and converts its reception signal obtained by the optical receiver into a signal in the frequency domain to perform a frequency analysis, the method comprising:
   selecting candidate values of sideband wave frequencies from the signal converted into one in the frequency domain to obtain an approximate value of a rotational frequency by decision of a majority of intervals of the sideband wave frequencies;
   obtaining candidate values of a carrier frequency from selection results of the candidate values of the sideband wave frequencies; and
   selecting the rotational frequency on the basis of candidate values of the rotational frequency from among the candidate values of the carrier frequency.

* * * * *